Figure 1:
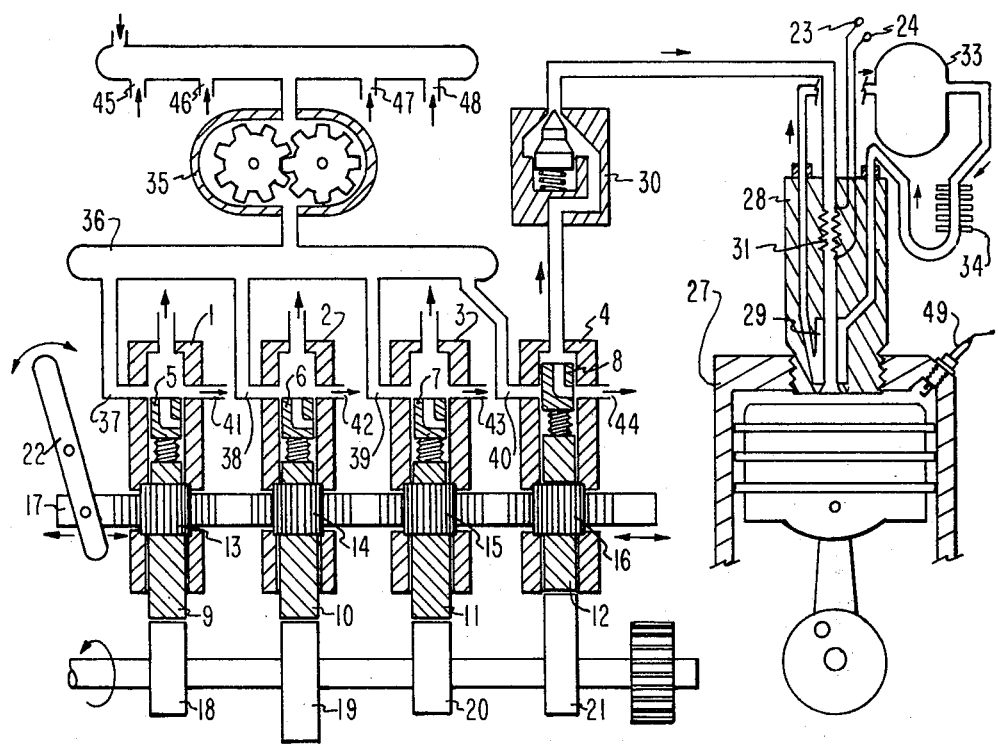

United States Patent [19]
O'Hare

[11] 4,362,137
[45] Dec. 7, 1982

[54] HYDROGEN PYROLYSIS FUEL INJECTION

[76] Inventor: Louis R. O'Hare, 1041 Ponderosa #2, Ft. Collins, Colo. 80521

[21] Appl. No.: 147,486

[22] Filed: May 7, 1980

[51] Int. Cl.³ .................. F02B 43/08; F02M 31/20; F02M 31/02

[52] U.S. Cl. .................. 123/295; 123/541; 123/3; 123/DIG. 12; 123/557; 239/13; 239/132.1; 239/133

[58] Field of Search ......... 123/1 A, 3, 536, DIG. 12, 123/538, 295, 294, 557, 549, 540, 541; 239/132, 132.1, 133, 135

[56] References Cited

U.S. PATENT DOCUMENTS

| | | | |
|---|---|---|---|
| 2,448,950 | 9/1948 | Barber et al. | 123/295 |
| 2,886,014 | 5/1959 | Konrad et al. | 239/132 |
| 3,868,939 | 4/1975 | Friese et al. | 123/557 |
| 3,892,211 | 7/1975 | Oyama | 123/540 |

FOREIGN PATENT DOCUMENTS 642431  9/1950  United Kingdom ............... 123/541

Primary Examiner—Craig R. Feinberg

[57] ABSTRACT

An ultralean fuel mixture ignition and induction system is disclosed in which very lean fuel-air mixtures are used in internal combustion engines by means of a novel method and apparatus which greatly increases the burning rate of extremely lean mixtures to thereby prevent afterfire and backfire which would otherwise result from these lean mixtures when used in an engine, this same improvement in burning rate being able to provide improved fuel economy in that less fuel is required per combustion event and it is also able to provide better control over exhaust emission products in that combustion is cooler and more complete. The increased burning rate producing these effects is achieved when fuel that is being directly injected by conventional methods is routed through a pyrolysis cell and a cooler on its way to the combustion chamber, the fuel being thereby stripped of some of its hydrogen and being thereby impelled along with the hydrogen into the cylinder during the compression cycle.

4 Claims, 3 Drawing Figures

HYDROGEN PYROLYSIS FUEL INJECTION

This present invention relates to internal combustion engine induction-ignition systems such as spark ignition systems and fuel injection ignition systems. Many elements of this system are similar to the diesel ignition system in which fuel under great pressure is injected into highly compressed and highly heated air and in which ignition of the fuel takes place when the fuel ignites upon contacting the compressed air. Like the diesel system this present system relies on hydraulic injection pressure on the fuel to force the fuel into the combustion chamber against the pressure of the compressed air in the combustion chamber, but it is unlike diesel fuel injection in that ignition does not take place when the fuel contacts the compressed air. In this invention the fuel air mixture is ignited later in the compression cycle by a separate means such as spark ignition. This present system, just as the prior systems mentioned, provides for the induction of fuel directly into the combustion chamber during the compression stroke by high fluid pressure exerted on liquid fuel to force it against compressed air in the combustion chamber; however, an aspect of the inventive concept of the present system is that, while injecting the fuel under the great hydraulic pressure on the liquid fuel, nevertheless pressure on the liquid fuel does not deliver only liquid fuel to the combustion chamber but hydrogen gas as well. Hydraulic pressure of the fuel injector pump forces liquid fuel into a pyrolysis cell or other dehydrogenator and then out of this cell into a cooler and finally into the combustion chamber. The liquid fuel is converted in route into a mixture of gas-vapor-liquid and this mixture remains under the influence of the hydraulic pressure placed on liquid fuel as it was pumped through the fuel injector pump. Since hydraulic pressure of fuel injector dimensions is made to act on the hydrogen formed downstream in the hydrolysis cell, hydrogen injected into the combustion chamber does not displace any air taken into the cylinder during the intake stroke. In conventional hydrogen enrichment systems hydrogen taken in along with air through the air intake necessarily displaces a volume of air decreasing volumetric efficiency. Turbocharging equipment and energy are required if compensation is to be made for the loss in volumetric efficiency. Accordingly, a point of difference between this present inventive concept and the prior art is the use of the liquid fuel injector to provide the injection of a quantity of gaseous hydrogen to be injected into the combustion chamber.

This present invention then does use other prior art in that it makes use of the art of hydrogen enrichment for the purpose of operating internal combustion engines on ultralean gas-air mixtures. This art is described in *NASA General Aviation Research Overview* 1976 by Roger L. Winblade and Judy A. Westfall at NASA Headquarters Washington, D.C. and published by The Society of Automotive Engineers in their publication number 760458 and the report number TMX 33-760 with the title, "New Potentials for Conventional Aircraft When Powered by Hydrogen Enriched Gasoline" by the authors Wesley A. Menard, Philip I. Moynihan and Jack H. Rupe of the Jet Propulsion Laboratory. The prior art described there uses hydrogen to increase the burning rate of very lean gas-air mixtures. Without the admixture of hydrogen gas the mixtures of fuel and air used in this art would be of such an order of leanness that their burning rates would be so slow as to produce afterfire and backfire in an internal combustion engine even though the total energy of the mixtures is adequate to operate the engine at normal power output. However, the induction system for inducting the hydrogen into the gas-air mixture acts against volumetric efficiency and reduces the overall efficiency of the engine because, for any given standard volume of hydrogen inducted into a cylinder, just that much air must be excluded since the volume of the cylinders is fixed. This difficulty is overcome in the prior art by the use of turbocharging wherein additional energy is extracted from the engine to operate the turbocharger to compress a greater quantity of air into the cylinder thereby compensating for the quantity and volume of air that is displaced by the hydrogen gas. In the present invention, however, the quantity and volume of air that is inducted into any cylinder is always the same as it would be without the addition of the hydrogen. This is because the hydrogen is not drawn into the cylinder along with the air to thereby occupy a certain percentage of the total volume of the filled chamber but rather the hydrogen is added only after the valves are closed and the compression stroke is taking place. It is only at that time that the action of the fuel injector pump impelling liquid fuel causes hydrogen gas to be formed and forced into the cylinder as it is only at that time that the liquid fuel is driven through the pyrolysis cell removing some hydrogen from the liquid injected fuel. While the use of hydrogen for a twenty percent reduction in gasoline consumption isn't unique to this present invention, nevertheless the method and means of formation and insertion is a novel simplification and improvement in the art.

A principal object of this invention then is to provide greater economy of operation for non-boosted gas engines by the use of the leanest possible mixtures consistent with normal power operation. Another object of the invention is to provide a very simple means of hydrogen production and induction still preserving volumetric efficiency. A further objective is to provide a means of internal cooling other than the use of fuel for internal cooling thereby maintaining internal cooling conditions necessarily required for low engine wear. Since either air or fuel may be used for internal cooling, it is preferable to use an excess of air where it is possible to control the burning rate of fuel. The invention's object then is to provide a cool but completely burning lean fuel mixture. In short the object is the practical use of hydrogen enrichment to increase to normal burning rates the otherwise slow burning rate of very lean fuel-air mixtures in gasoline engines. Finally since the combustion temperatures are low with this type of internal cooling, few nitrogen oxides are formed and control is made available over exhaust gas emissions.

Further clarification of the objectives and the way in which they are achieved may be seen from the following detailed description of the working mechanism and the method of operation. A conventional type of reciprocating gasoline engine is fitted with a direct fuel injection system. (The term "direct" here is ued in distinction to indirect injection in which fuel is sprayed outside the intake valve.) The fuel injection system is the conventional direct fuel injection system of the type employed in the diesel engine art. The manner in which the injection system is operated is also to some degree conventional but with certain distinctive variations. It is used in a conventional manner to achieve fuel metering and fuel induction directly to the combustion chamber during the compression stroke. However, the period during which injection actually takes place is different and it is adjusted so that direct injection begins immediately after the intake valve closes on the compression stroke and ceases injecting in the period immediately before the period when conventional spark ignition takes place. Conventional electric spark plug ignition is employed and it is timed in a conventional way to prevent detonation and to have maximum pressure occur within a few degrees after the beginning of the power stroke. Again the injection system of this present invention is distinctive and different from that of the diesel in that the fuel of this system is not injected a few degrees before the top of the stroke nor does the ignition cause ignition by the mere contact between the fuel and the hot compressed air as it does in the case of the diesel. In this inventive concept the fuel with the hydrogen gas taken from it is injected at approximately fifty degrees into the compression stroke and after the closure of the intake valve in order that there will be approximately a hundred degrees of piston movement during which the hydrogen will diffuse throughout the air compressing in the cylinder before ignition takes place. The diffusing time is distinctive of this injection system because the admixture of air and hydrogen assures the rapid burn of the mixture later when it is ignited. Another distinguishing characteristic of this invention is the placement of a pyrolysis cell or pyrolizer between the fuel injector metering pump and the fuel injector nozzle. This cell is downstream of a fuel injector valve to assure that only highly pressurized fuel in the quantity metered by the metering pump can enter the cell and the cylinder. Following the pyrolysis cell and in the fuel stream before the cylinder is a cooler to lower the hot fuel from the pyrolizer to a temperature below ignition temperature.

Just as in conventional fuel injection systems more fuel must be metered and pumped to the cylinder for each combustion event and in the same way more air must be inducted as the power control rack is moved in the direction of higher power, so also in this invention conventional methods are used to increase fuel quantity per combustion event. An example of this is the lengthening of the stroke of the piston in the fuel metering injector pump and inducting more air through the air intake. But in this invention there is the added requirement of removing more hydrogen for more hydrogen injection as the fuel flow to the cylinder increases. This may be done in a number of ways in various embodiments. In one embodiment the control rack is used to vary the position of controls that regulate the amount of energy used to heat the pyrolysis cell so that, as the rack is moved in the direction of higher power output linkage from the rack moves a reostat control reducing the resistance of the reostat to send more current through an electric circuit to a resistance heater in the pyrolysis cell. The cell thereby removes more hydrogen from the fuel flowing through it. This linkage control in one embodiment takes the form of an electric power control which varies the resistance of a small variable resistor which in turn controls a solid state current regulator that admits more current to the electric heater in the pyrolysis cell as the rack is moved toward the high power position and visa versa.

The method I have invented for hydrogen enrichment then consists in fuel metering and pressurization for direct injection in such a way that discrete fuel quantities for each combustion event in each cylinder are metered and pressurized for delivery to each cylinder in the proper time sequence so that each discrete quantity metered for each cylinder is routed to its particular cylinder for arrival and injection during the compression stroke of that cylinder. The next step in this method consists in converting each discrete metered quantity of fuel by dehydrogenation especially by pyrolysis into a liquid- vapor-gas mixture while still under the pressure of the injector pump, then cooling this mixture in a cooler to a temperature below the temperature which would produce ignition in the combustion chamber, and then injecting the mixture into the proper cylinder at a period of the compression stroke sufficiently early in that cycle to permit hydrogen diffusion into the compressed air and then igniting the fuel air mixture by conventional electric spark ignition.

Clarification of the method and the means used in this ultralean mixture system is had by referring to the following drawings.

FIG. 1 of the drawings shows a diagram of direct fuel injection using an individual pump injection system with one of the injection pumps connected to one of an engine's cylinders that has received injected fuel during its compression stroke via a pyrolysis cell and a cooler. A single cylinder is shown for purposes of illustration and other cylinders that connect in the same fashion to the other injector pumps are not shown.

Figure 2:
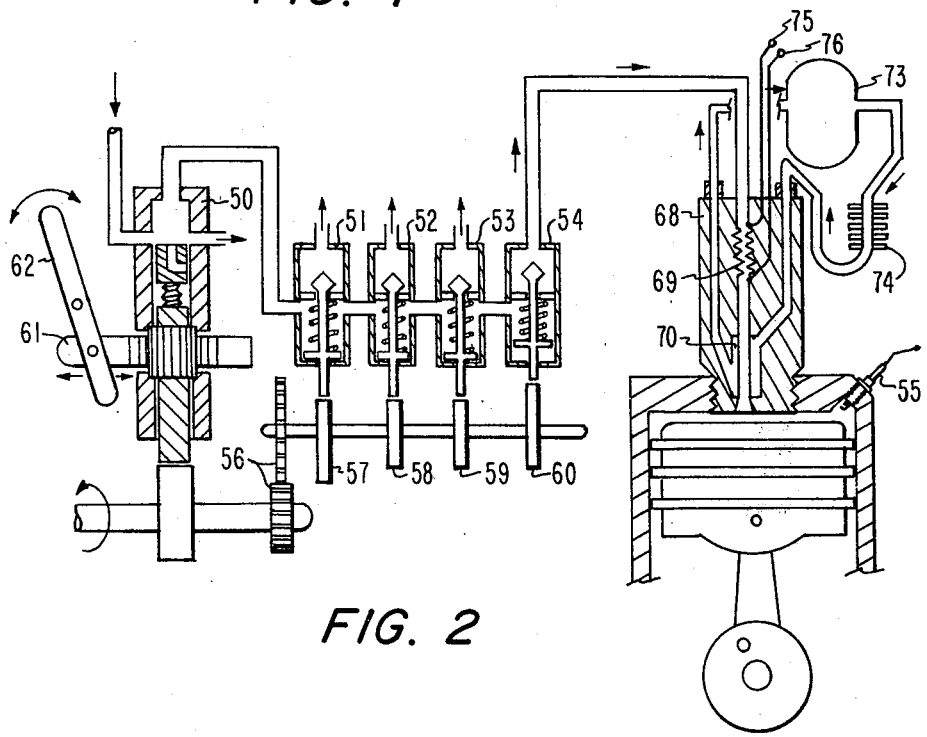

FIG. 2 of the drawings is a diagram of a fuel injection system using a high pressure distributor system and the pyrolysis cell of this invention. It shows one of the high pressure lines from one of the high pressure distributor valves connected to a pyrolysis cell followed by a cooler and the cylinder.

Figure 3:
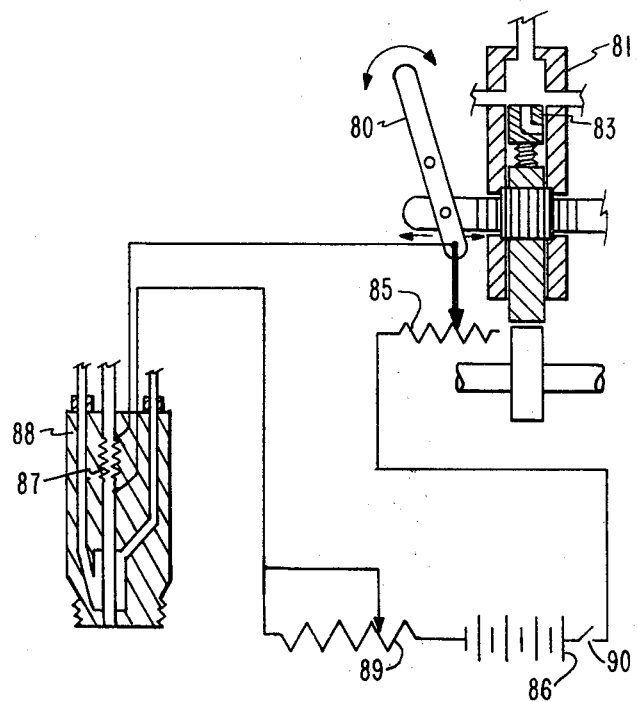

FIG. 3 shows a control rod link to a rack used to control pyrolysis cell output.

Referring then to FIG. 1 of the drawings, high pressure metering injector pumps, 1,2,3 and 4 have metering pistons 5,6,7 and 8. The stroke of these pistons is variable by means of a threaded sleeve which is able to either extend or shorten the effective length of the piston depending upon the direction of rotation of the piston's extension. The various extension sleeves 9,10,11 and 12 are in turn respectively rotated by pinions 13,14,15 and 16 which in turn are rotated by the back and forth movement of the rack 17. The rotation caused by the rack moving in one direction increases the length of the piston extensions causing them to make earlier contact with cams 18,19,20 and 21. The earlier contact causes the pistons to have a longer stroke and to thereby to pump more fuel so that the fuel flow per injection stroke is determined by the relative position of the rack and by how far and in which direction the pinions have been rotated. Rack 17 thereby exersizes control over the engine's power output. Control rod 22, that controls the rack, also controls the energy that heats the pyrolysis cell to regulate the amount of hydrogen to be removed from the fuel flowing through the cell. The use of this control rod 22 to control pyrolysis heat and hydrogen quantity is shown in FIG. 3. In FIG. 1 the high pressure metering injector pumps 1, 2, 3 and 4 each deliver metered pulses of fuel to engine cylinders through pyrolysis cells and coolers. For the sake of simplicity in the drawings only one cylinder 27 with its pyrolysis cell 28 and cooler 29 is shown. Injector pump 4 meters discrete quantities of fuel through pressure valve 30 to resistance heater 31 of pyrolysis cell 28 where the fuel is heated to a pyrolysis temperature of between 650 degrees C. and 1000 degrees C. and usually about 850 degrees and some of the hydrogen is removed from the liquid fuel. The amount of hydrogen removed is generally not more than would produce an air-fuel mixture with a twenty five percent excess air. With hydrogen, less excess air than this generally causes detonation and backfire. The hydrogen-liquid fuel mixture from cell 28 is then cooled in cooling jacket 29 shown to be of a type through which liquid coolant circulates from pump 33 and cooling fins 34. This cooler may have another configuration in another embodiment of the invention. Instead of the cooling jacket around the injection duct as shown here, simple cooling fins, not shown, may be used around the duct to cool it as is practiced in the state of the cooling art. The pump 33 and the coolant it circulates is used to circulate coolant through the cooler following each cylinder's pyrolysis cell. The drawing does not show these simple connections for the sake of diagram simplicity. The low pressure pump 35 receives liquid fuel such as gasoline or alcohol from a fuel supply not shown. Pump outlet manifold 36 helps conduct fuel to injector pumps inlet ports 37,38,39 and 40. Fuel not used by the pumps is recirculated from injector pump excess fuel ports 41,42,43 and 44 back to low pressure pump's intake manifold through its ports 45,46,47 and 48. Spark plug 49 ignites the air-fuel mixture. Electric terminals 23 and 24 connect electric power to resistance heater of pyrolysis cell. Pressure operated valve 30 for purposes of illustration is shown at a distance from the pyrolysis cell but for most effective timing operation it should be in as close physical proximity to the cell as possible.

Referring then to FIG. 2 of the drawings, the high pressure metering injection pump 50 is the same as pump 4 of FIG. 1. The rapid output pulses of 50 are delivered in sequence to the cylinders one after the other by valves 51,52,53 and 54 in engine fireing order. For diagram simplicity only valve 54 is shown connected but each valve has the same connections to its own cylinder. The pulse from each valve is timed to arrive at its cylinder in the compression cycle before conventional spark ignition from plug 55. Reduction gears 56 operate cams 57,58,59 and 60 to open valves 51,52,53 and 54 with each valve opening only once to exit one pulse for every four pulses of 50. These valves should be as close as possible to pyrolysis cell 68 and heater 69 which are the same as 28 and 31 of FIG. 1. Power rack 61 and control rod 62 are the same as rack 17 and control rod 22 of FIG. 1. In FIG. 2 pyrolysis cell 68 and heater 69 are the same as cell 28 and heater 31 of FIG. 1. Cooler 70 corresponds to 29 of FIG. 1. Pump 73 and fins 74 of FIG. 2 are the same as pump and fins 33 and 34 of FIG. 1. In FIG. 2 terminals 75 and 76 are the same as 23 and 24 of FIG. 1. In FIG. 2 spark plug 77 provides normal and conventional electric ignition.

Referring then to FIG. 3 and the use of the control rod link to control the hydrogen output of the pyrolysis cell, when the top of control rod 80 is moved to the right in this diagram and fuel pump 81, which is the same as pump 50 of FIG. 2, pumps more fuel with each stroke of its piston 83, then the slider of reostat 85 moves to the left and reduces its resistance. This causes more current to flow from battery 86 to electric resistance heater 87 of pyrolysis cell 88 thereby increasing the temperature of the cell and the quantity of the hydrogen removed from the fuel that is flowing through it. Variable resistor 89 is user to regulate the initial flow through the heater so that the heat and the rate of hydrogen removal and hydrogen injection may be adjusted to the engine, to the type of liquid fuel being used and to the mixture ratio that is most useful for the particular conditions in which the engine is being operated. Switch 90 is closed during operation.

The individual pump system and the high pressure distributor system have been used to show how injector systems can be employed to operate a pyrolyzed fuel injection for gasoline type engines. In a similar manner other direct fuel injection systems are sources of injection energy for driving fuel through the pyrolysis cells and into the cylinders of an engine. Examples are electric direct fuel injection systems in which the metering injection pumps are driven electrically and timed electrically, as well as low pressure type distributor injection systems and unit injection systems and others that are known in the art.

The linkage that is used to move the control rod represented by 80 in FIG. 3 also operates the butterfly valve of the air intake system not shown. It causes both systems to operate in unison so that an increase in air intake results also in fuel intake increase. Adjustment is made on these linkage to set the fuel air mixtures according to standard practice in the fuel injection art. A lean mixture setting is effected when the linkage is coupled in such a way that the air butterfly valve is made to have greater opening than normal by its position on the link relative to the fuel metering control position on the link. In short both the air intake valve and the fuel metering increase-decrease adjustment rack move in unison so that an increase in airflow opening causes an increase in fuel intake and visa versa, but linkage is adjusted for lean mixtures by having the link keep the air intake valve open wider than normal as both move together. This system and other systems of fuel-air mixture control as practiced and known to those skilled in the fuel injection art are used to provide the lean mixtures which are the subject of this invention, but they are not shown in the drawings because they are conventional art.

This description of the invention is not meant to exclude other hydrogen enrichment using a pyrolysis cell with an injection system, and another embodiment of this basic inventive concept employs all the elements of the above description without the cooler after the pyrolysis cell, and it uses a different timing for the injected fuel. In this embodiment hydrogen is removed from injected fuel immediately before the fuel arrives in the combustion chamber. The fuel-hydrogen gas mixture is injected a few degrees before the top of the compression stroke, just before the power stroke begins. In this way the superheated fuel, along with the hydrogen stripped from it, ignites as it meets the hot compressed air near the end of the compression stroke. Ignition burning rate for very lean mixtures is accelerated as the hot hydrogen gas rapidly diffuses into the compressed air reacting with it as rapidly as it encounters unreacted oxygen.

The pyrolysis cell may be assisted by dehydrogenation catalysts placed in the heating chamber of the cell.

I claim:

1. A hydrogen enrichment fuel injection system for burning ultralean fuel-air mixtures in gasoline type engines comprising,
   variable metering and high pressure pumping means for pumping discrete metered quantities of liquid fuel in consecutive pulses with these metered quantities being controllable to coincide with variable engine power demands, the greater the demand the more the fuel metered, and timing means whereby the consecutive pulses arrive at cylinders of the engine one after another, first at one cylinder then at another and so on in an order which is determined by engine firing order and at such a time duration in each cylinder that each cylinder receiving fuel in its proper sequence is at a period in its compression cycle when it begins to receive the pulse of fuel and has completed receiving the fuel pulse in a period before the completion of that same compression cycle and, pressure valving control means whereby fuel injection begins only when injection pressure is high enough to assure a positive pressure surge into the cylinder against air being compressed in each cylinder and, controlled hydrogen removal injector means comprising an injector housing containing a pyrolysis means comprising a chamber wherein each discrete fuel quantity is heated separately and by this heating effecting a partial pyrolysis of the liquid fuel thereby separating a quantity of hydrogen gas from the fuel and a cooling means for cooling a resulting mixture of the hydrogen gas and remaining fuel below ignition temperature by ducting said mixture through a cooler, wherein said mixture is injected into each cylinder while still under the pressure exerted by the fuel pumping means and, a fuel-air ignition means.

2. A hydrogen enrichment system as in claim 1 in which the duration of injection of the timing means injecting during the compression cycle begins after intake valve closure and is completed before a normal period of spark ignition in a gasoline type engine and in which the fuel-air ignition means is conventional spark plug ignition.

3. A hydrogen enrichment fuel injection system as in claim 1 in which the pressure valving control means is a pressure operated valve which provides positive opening operation when the injection pressure is above air pressure in each cylinder.

4. A hydrogen enrichment fuel injection system as in claim 1 in which the pressure valving control means is a series of cam operated high pressure valves with one of the series of valves in the injection line immediately before each injector housing.

* * * * *